United States Patent
Nishiwaki

(10) Patent No.: US 7,058,295 B2
(45) Date of Patent: Jun. 6, 2006

(54) ELECTRONIC EQUIPMENT

(75) Inventor: Kenya Nishiwaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 10/770,037

(22) Filed: Feb. 2, 2004

(65) Prior Publication Data

US 2005/0002154 A1    Jan. 6, 2005

(30) Foreign Application Priority Data

Feb. 14, 2003    (JP)    ............... 2003-037181

(51) Int. Cl.
  *G03B 17/02*    (2006.01)
  *H01M 2/10*    (2006.01)

(52) U.S. Cl. ............... 396/539; 348/374; 429/100

(58) Field of Classification Search ............... 396/536, 396/539; 429/100; 361/679; 348/373, 374; 340/7.63

See application file for complete search history.

(56) References Cited

U.S. PATENT DOCUMENTS 4,712,898 A * 12/1987 Haraguchi ............... 396/539
5,193,707 A * 3/1993 Mizumura ............... 220/326
5,270,702 A * 12/1993 Krolak ............... 340/7.63
5,372,395 A * 12/1994 Yang ............... 292/147
7,004,648 B1 * 2/2006 Ariga ............... 396/419

FOREIGN PATENT DOCUMENTS

JP    2003142841 A * 5/2003

* cited by examiner

*Primary Examiner*—W. B. Perkey
*Assistant Examiner*—Rishi Suthar
(74) *Attorney, Agent, or Firm*—Cowan, Liebowitz & Latman, P.C.

(57) ABSTRACT

Electronic equipment is disclosed with which, even when a main body receives an external force, the deformation of the main body can be restrained. The electronic equipment comprises: a main body, having a housing chamber for housing accessories; a base member, rotating with respect to an opening of the abovementioned housing chamber; and a lid member, opening and closing the abovementioned opening along with the abovementioned base member, mounted in a manner enabling sliding with respect to the abovementioned base member, and engaged and disengaged with respect to the main body by sliding movements.

7 Claims, 9 Drawing Sheets

FIG.5
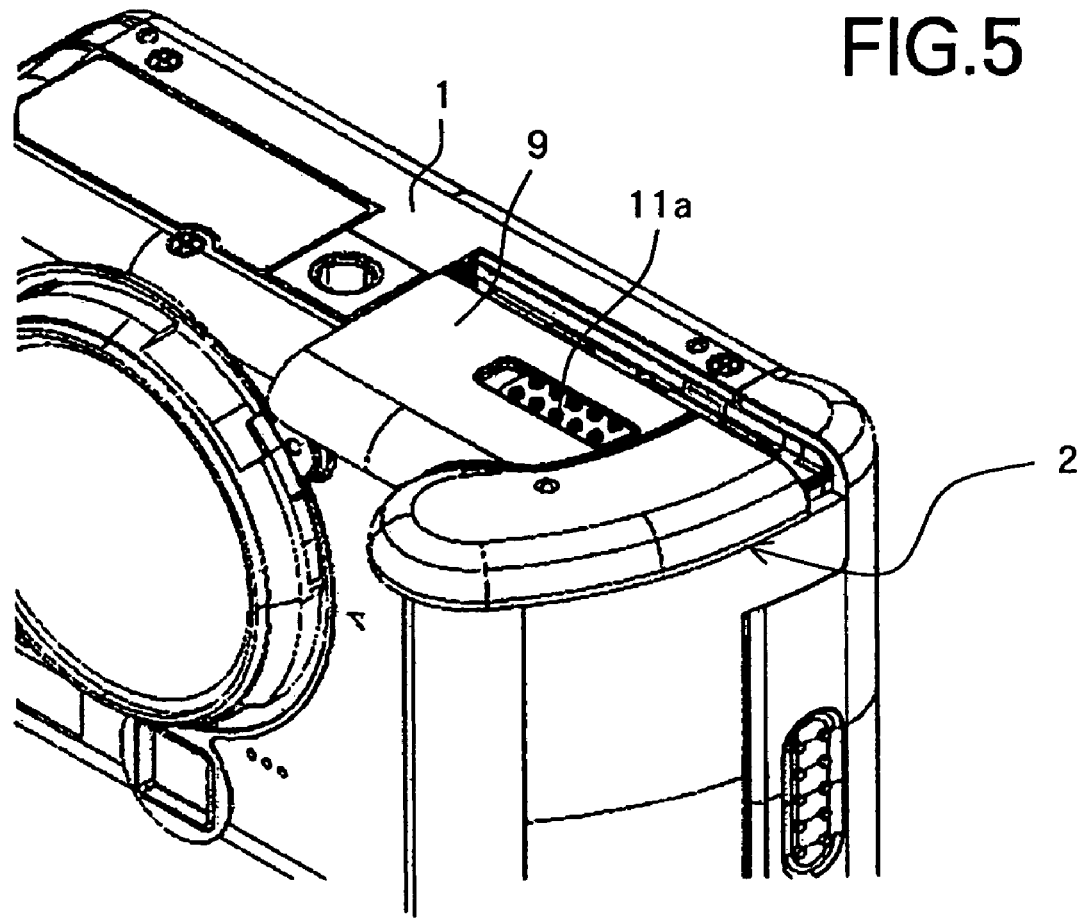
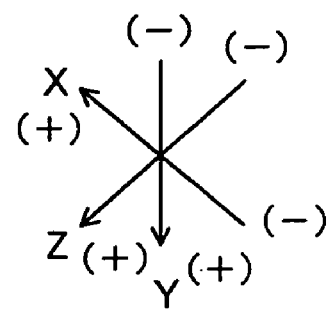

BATTERY CHAMBER

ELECTRONIC EQUIPMENT

BACKGROUND OF THE INVENTION

1. Field of the Invention

This invention concerns electronic equipment, having a housing chamber, which is disposed inside a main body and is for housing accessories, such as batteries, etc., and specifically concerns the structure of a lid for covering an opening of the housing chamber.

2. Description of the Related Art

Since priorly, various propositions have been made in regard to a structure for housing batteries in compact, portable electronic equipment, such as a camera. For example, there is an arrangement in a main camera body in which the inner side of an action grip portion, which a photographer holds when image-taking is made hollow and this region is used as a battery chamber. Such a structure is employed widely. This structure shall now be described using FIGS. 10 and 11.

In FIG. 10, Reference Numeral 31 denotes a main camera body and 31a is an action grip portion. Reference Numeral 32 denotes a battery lid, which covers an opening for putting and taking batteries into and out from the interior of the main camera body 31. With this camera, the battery lid 32, in the state in which it covers the opening (the state shown in FIG. 10), is slid in the Z (+) direction and then rotated by 90 degrees or more to open the opening.

FIG. 11 is an exploded perspective view of the camera that mainly shows the structure for housing the batteries. This camera is of a type with which four size AA batteries 33 to 36 are housed inside the main camera body 31. Reference Numeral 37 denotes a front cover of the main camera body 31, Reference Numeral 38 denotes a rear cover, and Reference Numeral 39 denotes a battery holder. The space formed by the front cover 37 and the battery holder 39 becomes a battery chamber for housing the size AA batteries 33 to 36.

The structure of the battery lid 32 shall now be described. Reference Numeral 40 denotes a first electrode member that becomes the electrode for the size AA batteries 33 and 36 and has contact portions 40a and 40b that come in contact with the size AA batteries 33 and 36. The first electrode member 40 is mounted via a rotation shaft 41 to a bearing portion 39a of the battery holder 39 and can be rotated by 90 degrees or more about the rotation shaft 41.

Reference Numeral 42 denotes a lid member that forms the exterior of the battery lid 32 and has guide portions 42a and 42b at its inner side. The guide portions 42a and 42b are engaged with sliding portions 40c and 40d of the first electrode member 40 and the sliding portions 40c and 40d are made movable in the Z direction along the guide portions 42a and 42b.

Engaging portions 42c, 42d, and 42e, which are formed on the lid member 42, can be engaged with claw portions 37a, 37b, and 37c, provided on the front cover 37. Reference Numeral 43 denotes a second electrode member that becomes the electrode for the size AA batteries 34 and 35 and is fixed by a machine screw 44 onto the lid member 42.

With the above-described structure, when the battery lid 32 is slid in the Z (+) direction from the state shown in FIG. 10 (the state in which the opening of the battery chamber is covered), just the lid member 42 moves slidingly. Here, since the first electrode member 40 is supported by the bearing portion 39a via the rotation shaft 41, it is prevented from moving along with the lid member 42. By sliding movement of the lid member 42, the engaging portions 42c, 42d, and 42e become disengaged from the claw portions 37a, 37b, and 37c. When the battery lid 32 is rotated about the rotation shaft 41, the first electrode member 40 and the lid member 42 rotate integrally and then the opening of the battery chamber becomes opened. Insertion or detachment of the size AA batteries 33 to 36 is thereby enabled.

During image-taking, it is important to hold the camera firmly so that camera shake will not occur, and for this purpose, the action grip portion is demanded to have a structure that is easy to hold and can be gripped firmly. In order so that the action grip portion can be held firmly, the action grip portion is required to have an adequate strength that can withstand external forces.

However, in a case where a battery housing chamber (cavity portion) is provided inside the action grip portion as in the above-described prior art, the thickness of the action grip portion becomes thin and the strength and rigidity may become insufficient.

With the above-described prior art, since the battery lid 32 simply covers the opening of the battery chamber, when the camera body 31 (action grip portion 31a) receives a large external force, it is bent readily and the inner walls (especially at the opening) of the battery chamber deform. When the battery chamber deforms, the batteries 33 to 36 that are housed inside the battery chamber and the electrode members 40 and 43 of the battery lid 32 are put in a non-contacting state instantaneously and this may prevent the normal supplying of power from the batteries. In such a state, the electronic circuits provided inside the camera body 31 and the holding of recorded information may be subject to adverse effects.

SUMMARY OF THE INVENTION

One aspect of electronic equipment of the present invention comprises: a main body, having a housing chamber for housing accessories; a base member, rotating with respect to an opening of the abovementioned housing chamber; and a lid member, opening and closing the above-mentioned opening along with the abovementioned base member, mounted in a manner enabling sliding with respect to the abovementioned base member, and engaged and disengaged with respect to the main body by sliding movements. Here, when, in the closed state, the inner wall of the above-mentioned housing chamber deform by a predetermined amount towards the inner side of the abovementioned housing chamber, the abovementioned base member comes in contact with the abovementioned inner wall to repress deformation of the inner wall by the predetermined amount or more.

The characteristics of the electronic equipment of the present invention shall become clear through the following description of a specific embodiment in reference to the drawings.

BRIEF DESCRIPTION OF THE DRAWINGS

FIG. 5 is a partial external view of the camera when the battery lid is in a partially opened state.

DETAILED DESCRIPTION OF THE PREFERRED EMBODIMENT

Figure 1:
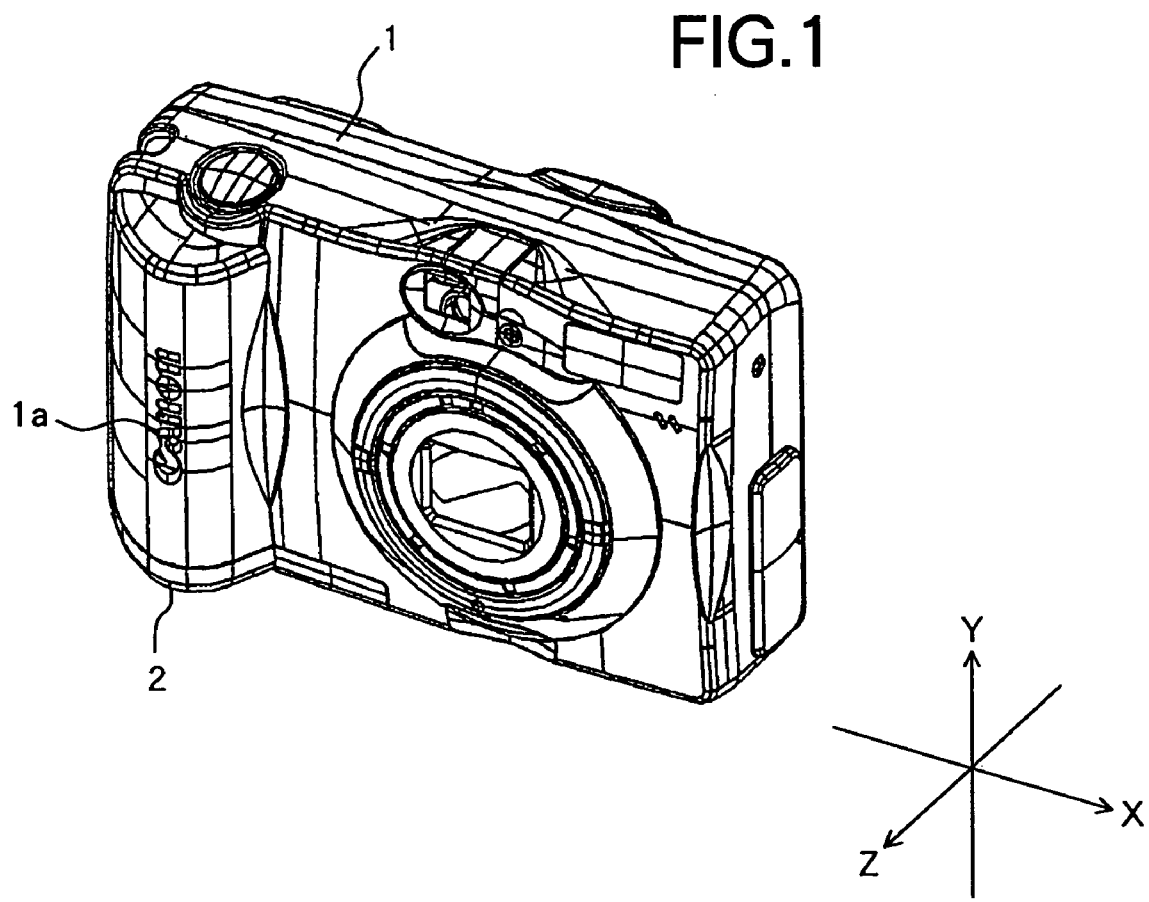
FIG. 1 is an external perspective view of a camera, which is embodiment of a present invention.

FIG. 1 shows an external perspective view of a camera (electronic equipment), which is an embodiment of a present invention. The directions indicated by the arrows X, Y, Z are the left/right direction, vertical direction, and thickness direction of the camera respectively and these are mutually orthogonal.

In FIG. 1, Reference Numeral 1 denotes a camera body, which is equipped with members necessary for image-taking, such as an image taking lens, a shutter, image pickup member (film or CCD or other image pickup element). Reference Numeral 1a denotes an action grip portion that is held by a photographer during image-taking. As shall be described below, a battery chamber for housing batteries is provided in the interior of the action grip portion 1a.

Reference Numeral 2 denotes a battery lid that is provided at the bottom surface of the main camera body 1 and covers an opening for putting and taking batteries into and out from the interior of the battery chamber provided inside the main camera body 1. The battery lid 2 is movable in the Z direction with respect to the main camera body 1 and is supported in a manner enabling rotation with respect to the main camera body 1. That is, as shall be described later, the opening of the battery chamber can be opened by moving the battery lid 2 in the Z direction and then rotating the battery lid 2.

Figure 2:
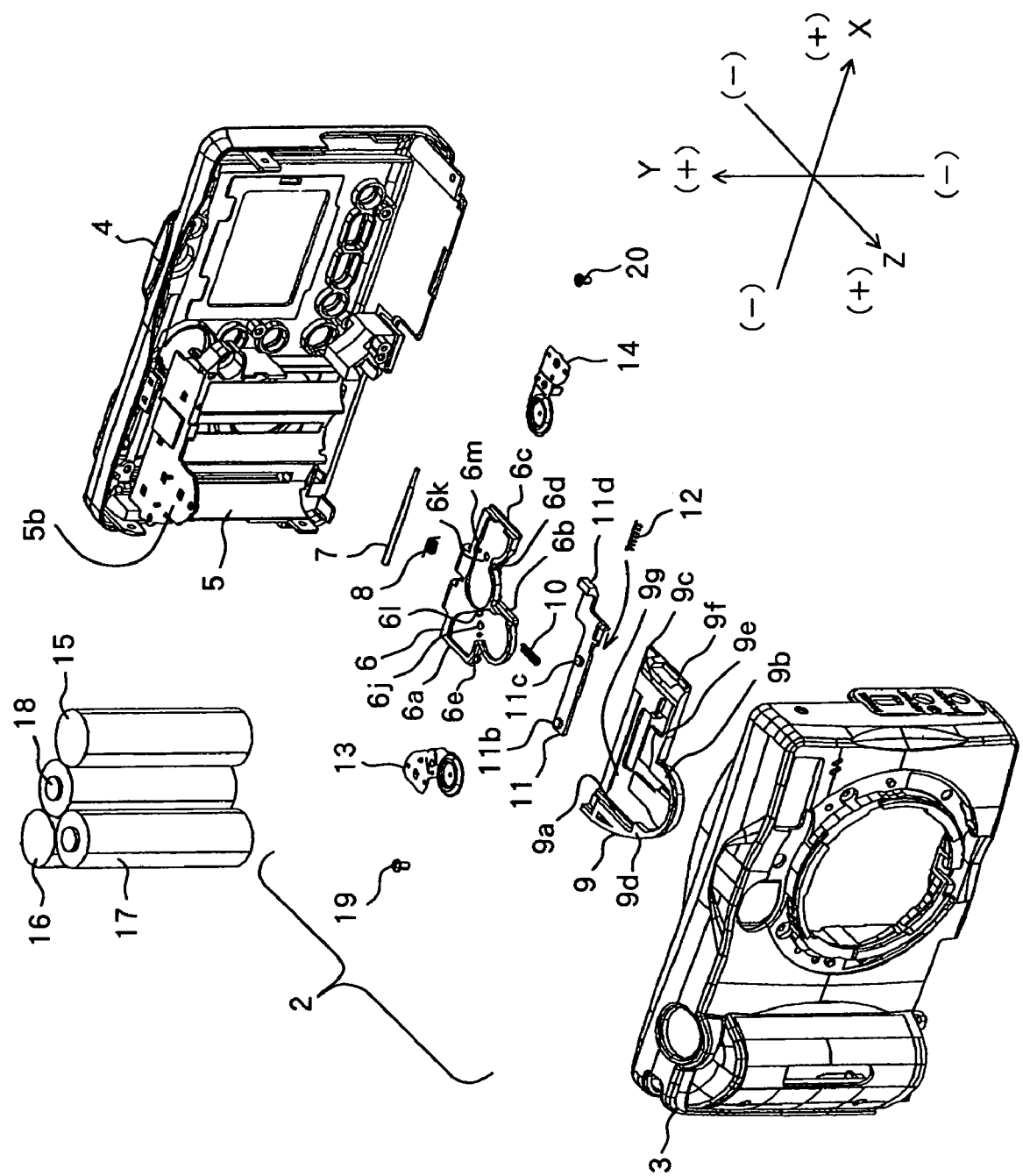
FIG. 2 is an exploded perspective view as viewed from above of the camera.
Figure 3:
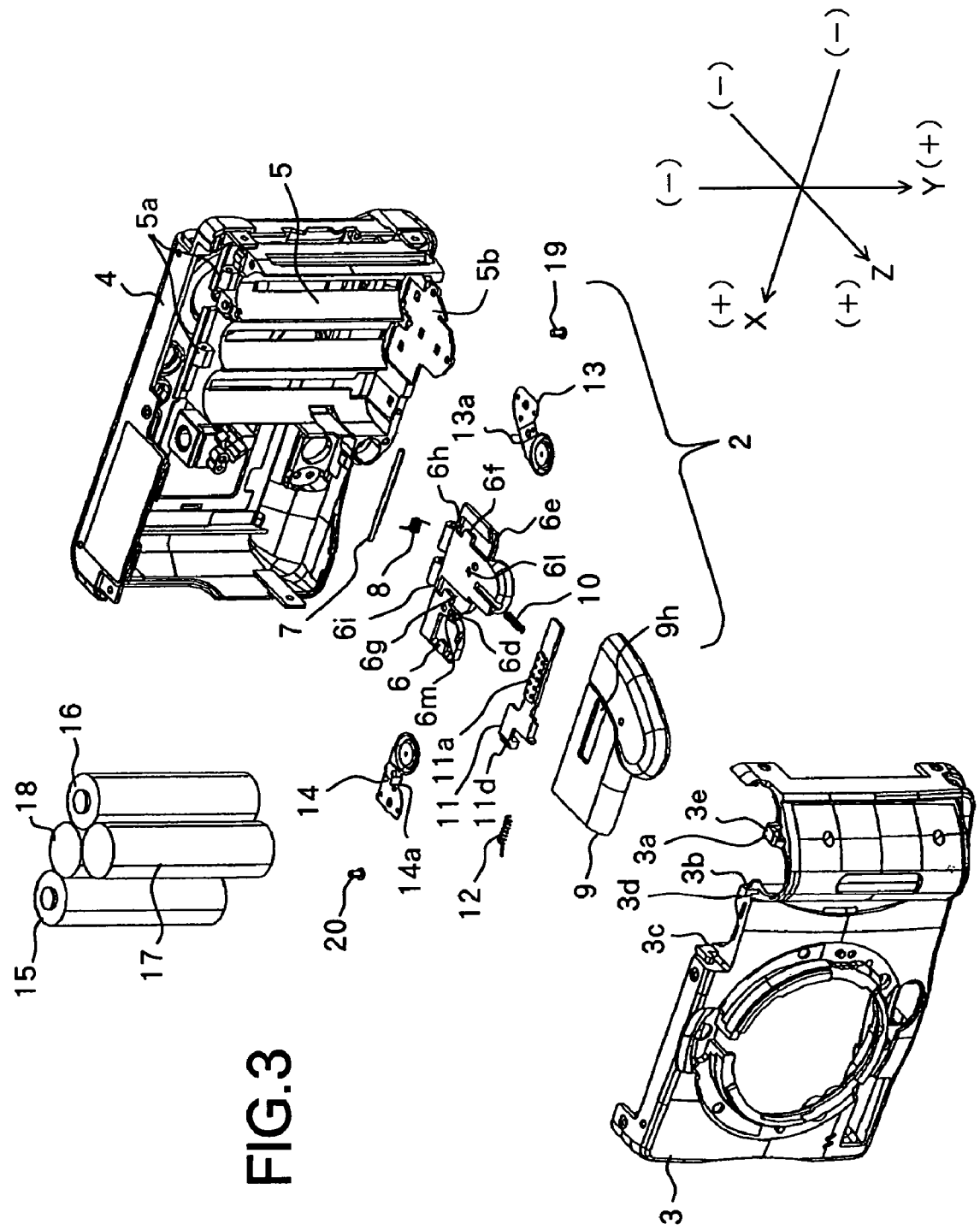
FIG. 3 is an exploded perspective view as viewed from below of the camera.

The internal structure of the camera of this embodiment shall now be described using FIGS. 2 and 3. FIGS. 2 and 3 are exploded perspective views of the camera, with FIG. 2 being a view of the camera as viewed from above and FIG. 3 being a view of the camera as viewed from below.

In FIGS. 2 and 3, Reference Numeral 3 denotes a front cover that forms the exterior of the front face side of the main camera body 1 and Reference Numeral 4 denotes a rear cover that forms the exterior of the rear face side of the main camera body 1. Reference Numeral 5 denotes a battery holder that is disposed inside the main camera body 1 and is for holding batteries 15 to 18.

The space formed by the battery holder 5 and the front cover 3 becomes the battery chamber for housing the batteries 15 to 18.

The structure of the battery lid 2 shall now be described in detail.

Reference Numeral 6 denotes a base member formed of a non-conductive mold resin and is mounted, via a rotation shaft 7, to a bearing portion 5a, formed at the lower and face of the battery holder 5. The base member 6 is thereby enabled to rotate by 90 degrees or more about the rotation shaft 7.

Reference Numeral 8 denotes a rotation spring that is mounted with the rotation shaft 7 passing through it and constantly energizes the base member 6 in one direction (in the direction in which the battery lid 2 opens).

Reference Numeral 9 denotes a lid cover member (lid member) that forms the exterior of the battery lid 2 and has guide groove portions 9a to 9c at its inner side. The guide groove portions 9a to 9c are arranged to engage with ribs 6a to 6c, respectively, of the base member 6 and the guide groove portions 9a to 9c and the ribs 6a to 6c are made slidable relative to each other in the Z direction. Also, engaging portions 9d to 9f, formed on the lid cover member 9, are made respectively engageable and disengageable with respect to claw portions 3a to 3c, which are provided integrally on the front cover 3.

Contacting surfaces 3d and 3e are provided on the side walls of the claw portions 3a and 3b, respectively. The contacting surfaces 3d and 3e are disposed so as to oppose contacting surfaces 6d and 6e, provided at a partial region of the side surface (end surface) of the base member 6, with a predetermined clearance in between and are enabled to come in contact with the contacting surfaces 6d and 6e upon deformation of the front cover 3 (contacting surfaces 3d and 3e).

Since the contacting surfaces 3d and 3e are formed integral to the claw portions 3a and 3b, the number of parts and the number of assembly process can be reduced and the parts strengths can be increased in comparison to a case where the contacting surfaces 3d and 3e and the claw portions 3a and 3b are formed separately.

Reference Numeral 10 denotes a first energizing spring that is disposed between the base member 6 and the lid cover member 9 and constantly energizes the lid cover member 9 away from the base member 6 in the Z (+) direction.

Reference Numeral 11 denotes a release member that is disposed in a mounting groove portion 9g, provided in the lid cover member 9. A slide button 11a, which is formed in a protruding manner on one surface of the release member 11, passes through a slot-like slide hole portion 9h formed in the lid cover member 9 and is exposed to the exterior of the lid cover member 9 (battery lid 2). The length of the slide hole portion 9h is made longer than the length of the slide button 11a and the slide button 11a (release member 11) is made movable (in the X direction) along the slide hole portion 9h.

Lock pins 11b and 11c, which are formed on the other surface of the release member 11, that is, on the surface at the side opposite the surface on which the slide button 11a is formed, respectively fit in guide groove portions 6f and 6g, which are formed in the base member 6 and extend in the Z direction.

In assembling the battery lid 2, first the slide button 11a is fitted into the slide hole portion 9h and the lock pins 11b and 11c are slidingly fitted into the guide groove portions 6f and 6g. The lock pins 11b and 11c are thereby moved to slide groove portions 6h and 6i. At this point, the guide groove portions 9a to 9c are engaged with the ribs 6a to 6c.

Since the slide groove portions 6h and 6i extend in the X direction, release member 11 can be moved slidingly in the X direction.

Since in assembling the battery lid 2 as described above, the lid cover member 9, onto which the release member 11 has been assembled, is simply slid with respect to the base member 6, the battery lid 2 can be assembled readily.

Reference Numeral 12 denotes a second energizing spring that is disposed between the lid cover member 9 and the release member 11 and energizes the release member 11 in the X direction (one direction). By receiving the energizing force of the second energizing spring 12, the release member 11 is held at a position at which the slide button 11a is put in contact with one end of the slide hole portion 9h.

Reference Numeral 13 and 14 denote battery terminals and contact the size AA batteries 15 to 18 that are housed inside the battery chamber of the main camera body 1. Machine screws 19 and 20 are fit into machine screw hole portions 6j and 6k and the battery terminals 13 and 14 thereby fixed to one surface of the base member 6.

Terminals, corresponding to the battery terminals 13 and 14, are also provided at a surface 5b of the battery holder 5 that opposes the base member 6. By providing the battery terminals 13 and 14 on the battery lid 2 (base member 6) as well, the size AA batteries 15 to 18 can be used as the power supply of the camera as in the present embodiment.

Here by bending the battery terminals 13 and 14, the battery terminals 13 and 14 can be provided with a spring property. The battery terminals 13 and 14 can thereby be put into pressed contact with the batteries 15 to 18 and the reliability of the electrical connection between the battery terminals 13 and 14 and the batteries 15 to 18 can be increased.

Lock portions 13a and 14a, formed on the battery terminals 13 and 14, respectively pass through through hole portions 6l and 6m of the base member 6 and protrude from the other surface (the surface shown in FIG. 3) of the base member 6. The lock portions 13a and 14a that protrude from the through hole portions 6l and 6m are enabled to be put in contact with the release member 11 that is assembled onto the lid cover member 9.

By putting the lock portions 13a and 14a into contact with the release member 11, the lid cover member 9, onto which the release member 11 has been assembled, can be prevented from becoming detached from the guide groove portions 6f and 6g. The lock pins 11b and 11c of the release member 11 (lid cover member 9) are thereby made movable in the Z direction across predetermined regions of the guide groove portions 6f and 6g.

The opening/closing operations of the battery lid 2 of the camera of the above-described arrangement shall now be described using FIGS. 4 to 9. First, the operations of opening the battery lid 2 and housing the batteries 15 to 18 in the battery chamber shall be described.

Figure 4:
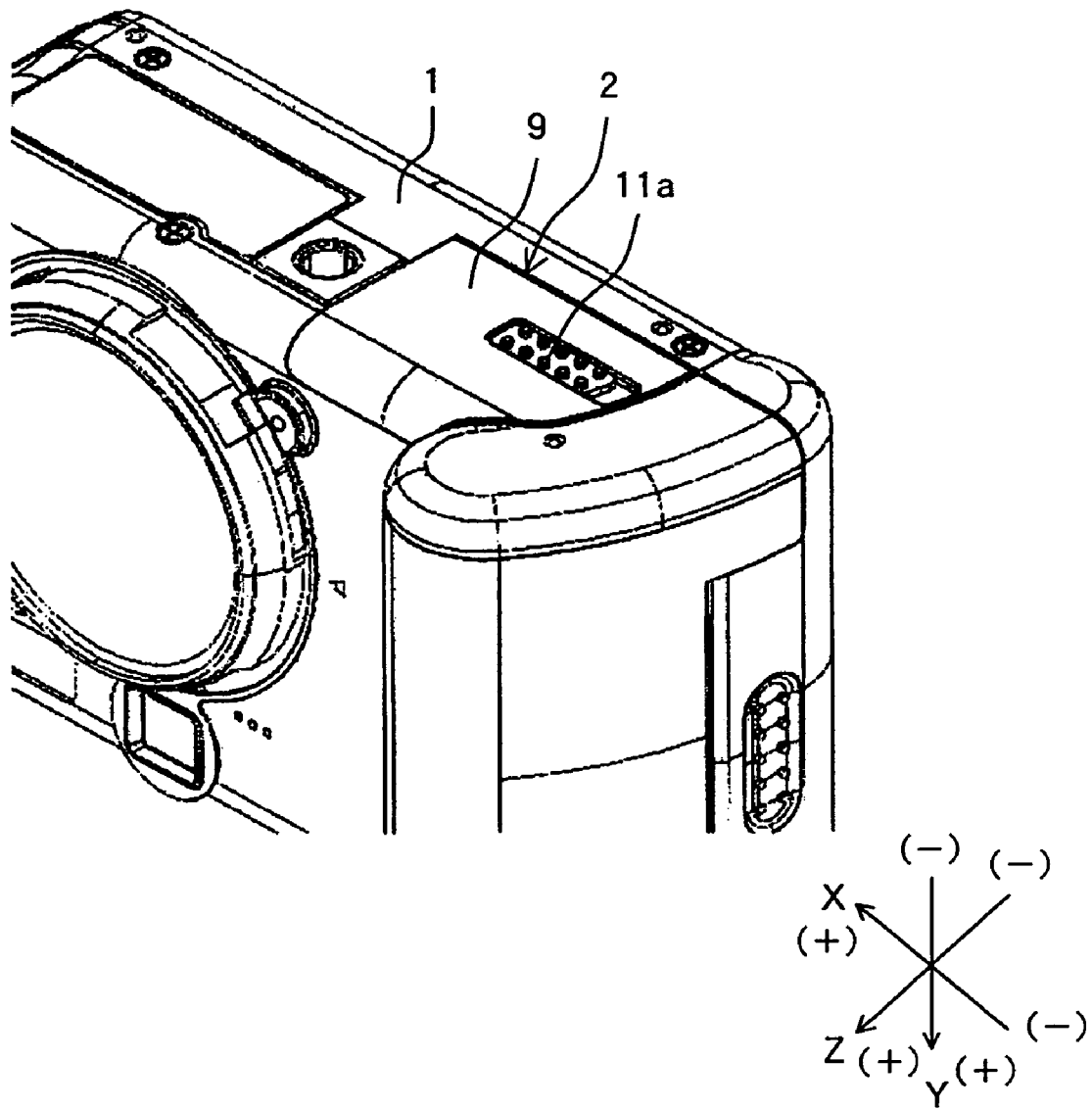
FIG. 4 is a partial external view of the camera when a battery lid is in the closed state.
Figure 7:
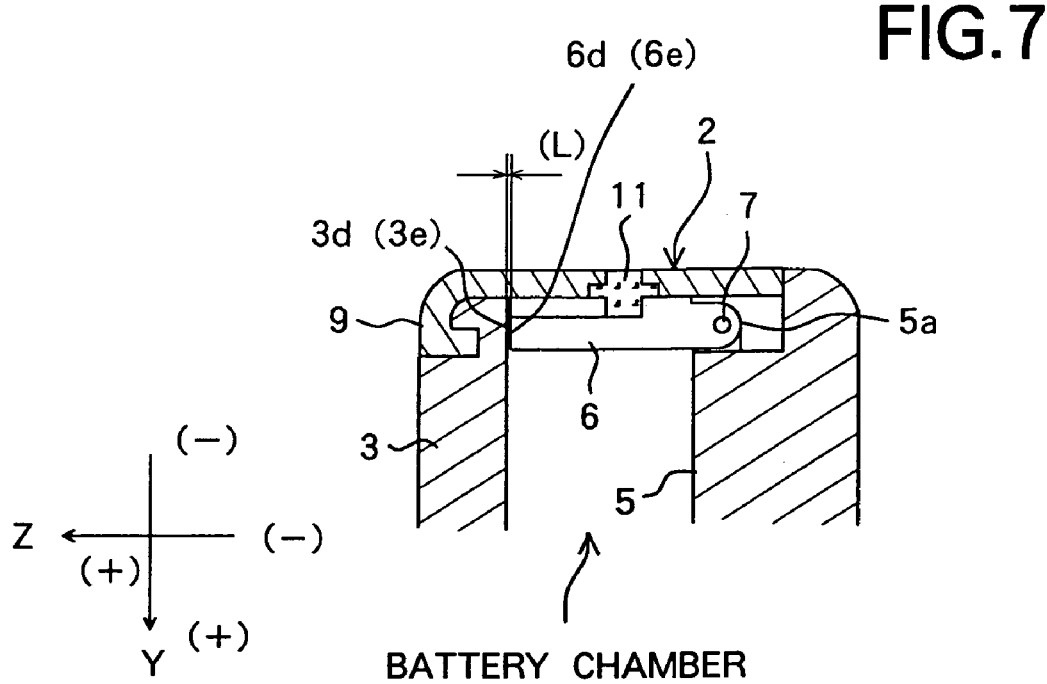
FIG. 7 is a partial sectional view of the camera when the battery lid is in the closed state.

The state in which the battery lid 2 closes the opening of the battery chamber is shown in FIGS. 4 and 7. In this state, the release member 11 is energized in the X (+) direction of FIG. 4 by the energizing force of the second energizing spring 12 and an end portion 11d of the release member 11 (see FIGS. 2 and 3) is engaged with an engaging portion (not shown) provided in the camera body 1. The battery lid 2 is thereby maintained in the state shown in FIG. 4.

When in order to open the opening of the battery chamber, an operator slides the slide button 11a in the (−) direction of FIG. 4 with a finger, the lock pins 11b and 11c of the release member 11 move along the slide groove portions 6h and 6i of the base member 6, the engagement of the end portion 11d of the release member 11 with the engaging portion (the camera body 1) is released and the lid cover member 9 becomes movable in the Z (+) direction of FIG. 4.

Here, a detection switch may be provided at the position of the main camera body 1 that engages with the end portion 11d of the release member 11 and camera operations may be controlled, based on an output signal from the detection switch, by a control circuit disposed inside the main camera body 1.

That is, when the end portion 11d of the release member 11 is in contact with the detection switch, since the battery lid 2 is in the state of completely covering the opening of the battery chamber (the state of FIG. 4), the control circuit may be made to put the camera in the operating state based on an output signal (ON signal) from the detection switch.

Also, when the end portion lid of the release member 11 is not in contact with the detection switch, since the battery lid 2 is in the state of not completely covering the opening of the battery chamber (the state of FIG. 5 or 6), the control circuit may be made to perform necessary processing operations (for example, to put the camera in the non-operating state) based on an signal (OFF signal) from the detection switch.

Since the possibility that the battery lid 2 will be opened will be high when the end portion 11d is not in contact with the detection switch, by performing the necessary processing operations in advance at the point at which the end portion 11d and the detection switch are put in the non-contacting state, the problem, of stoppage of the supplying of the power of the batteries 15 to 18 to the circuits in the main camera body 1 by the sudden opening of the battery lid 2, can be avoided.

Also, when the end portion 11d and the detection switch are in the non-contacting state, since the battery lid 2 is in the opened state or is in a state in which it may become opened, the power of the batteries 15 to 18 may not be supplied to the circuits inside the main camera body 1. Thus by putting the camera in the non-operating state in advance in such a case as mentioned above, the problem of power not being supplied to the circuits inside the main camera body 1 can be avoided.

Figure 8:
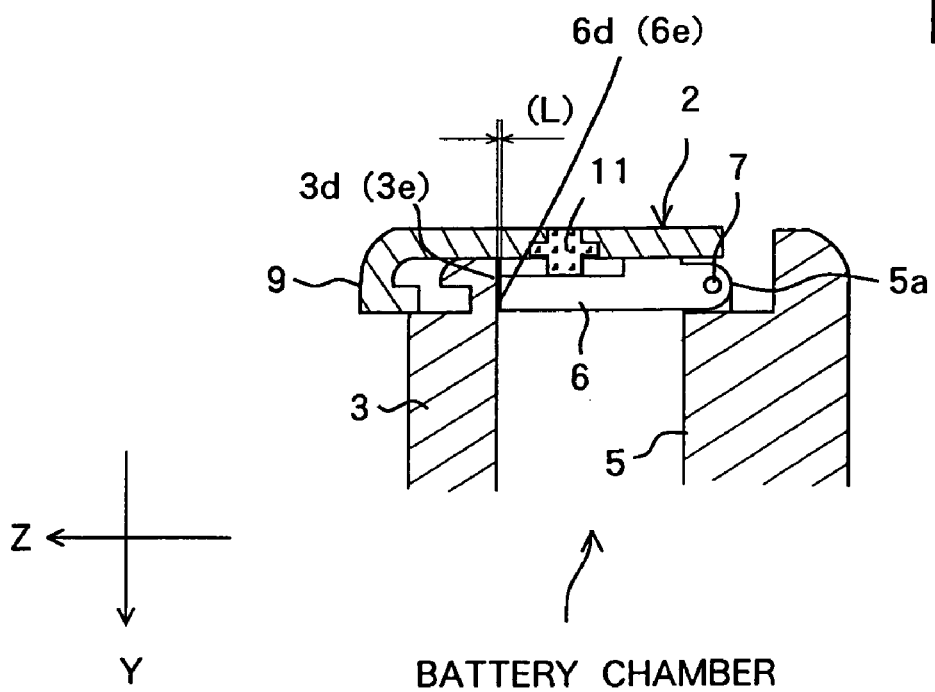
FIG. 8 is a partial sectional view of the camera when the battery lid is in a partially opened state.

When the lid cover member 9 is slid in the Z (+) direction while the slide button 11a is still pressed with the finger (FIG. 5), the lock pins 11b and 11c of the release member 11 move along the guide groove portions 6f and 6g of the base member 6, the engagements of the engaging portions 9d to 9f of the lid cover member 9 with the claw portions 3a to 3c of the front cover 3 become disengaged (FIG. 8).

When the finger is released from the slide button 11a in the state shown in FIG. 8, the battery lid 2 receives the energizing force of the rotation spring 8 and rotates in the clockwise direction of FIG. 8 about the rotation shaft 7. Since the lid cover member 9 constantly receives the energizing force from the first energizing spring 10 in this process, it remains shifted with respect to the base member 6.

Since an appropriate clearance L is provided between contacting surfaces 3d and 3e and contacting surfaces 6d and 6e as shown in FIG. 8, the contacting surfaces will not collide with each other when the battery lid 2 is rotated and the battery lid 2 can thus be rotated smoothly.

When by the rotation of the battery lid 2 by 90 degrees or more, the opening of the battery chamber opens completely (FIGS. 6 and 9), the state in which the size AA batteries 15 to 18 can be placed in or taken out in the Y direction is entered.

Since by simply sliding the lid cover member 9, the engagement of the engaging portions 9d to 9f and the claw portions 3a to 3c can be released easily and the battery lid 2 can thereafter be opened simply by removing the finger from the battery lid 2, the operation of opening the battery lid 2 is facilitated.

Also, when the battery lid 2 is in the closed state, the lid cover member 9 covers the opening of the battery chamber completely and the surface of the lid cover member 9 becomes a surface that is continuous with the surface of the external members (front cover 3 and rear cover 4) of the main camera body 1. The battery lid 2 is thus made beautiful in outer appearance as well.

The operations of housing the batteries 15 to 18 in the battery chamber shall now be described.

Figure 6:
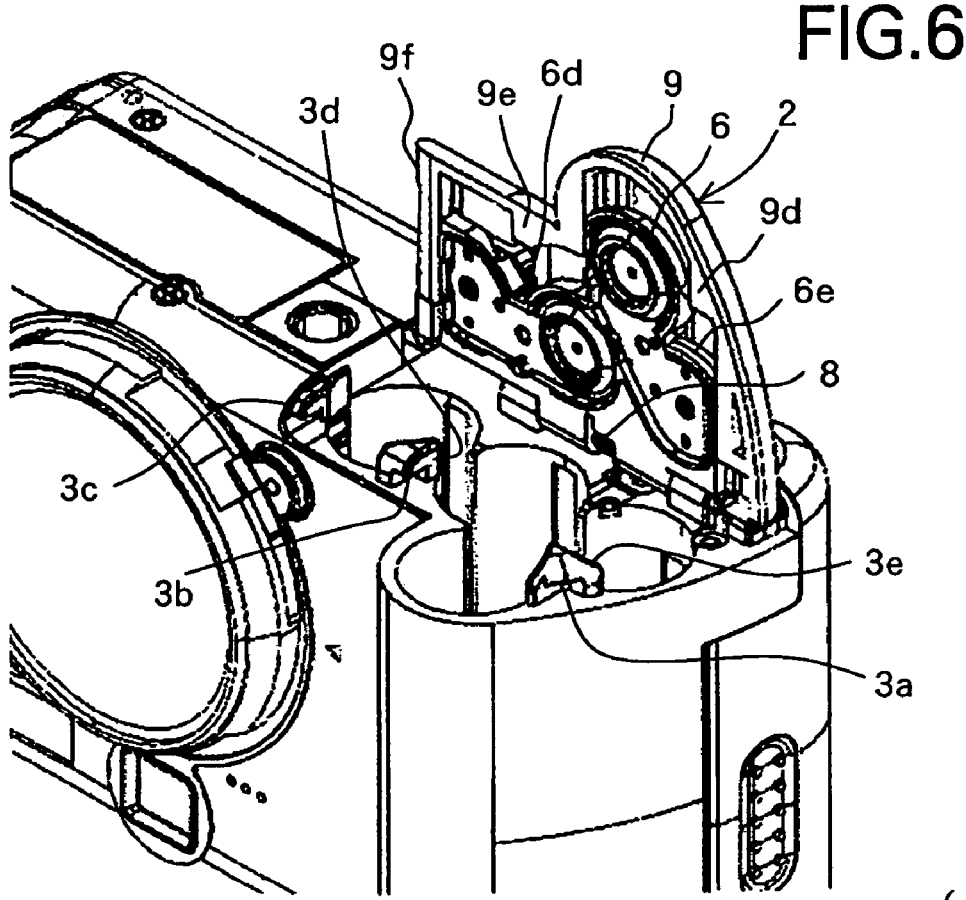
FIG. 6 is a partial external view of the camera when the battery lid is in the opened state.
Figure 9:
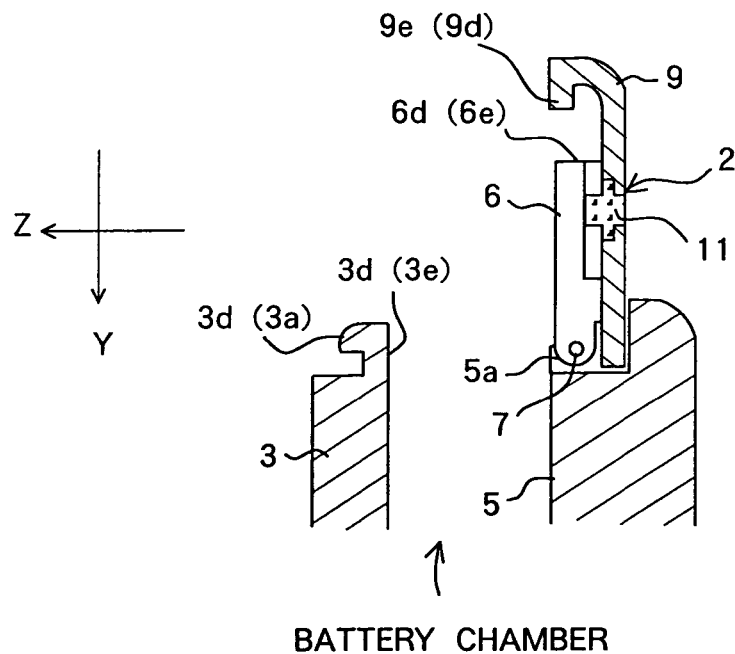
FIG. 9 is a partial sectional view of the camera when the battery lid is in the opened-state.
Figure 10:
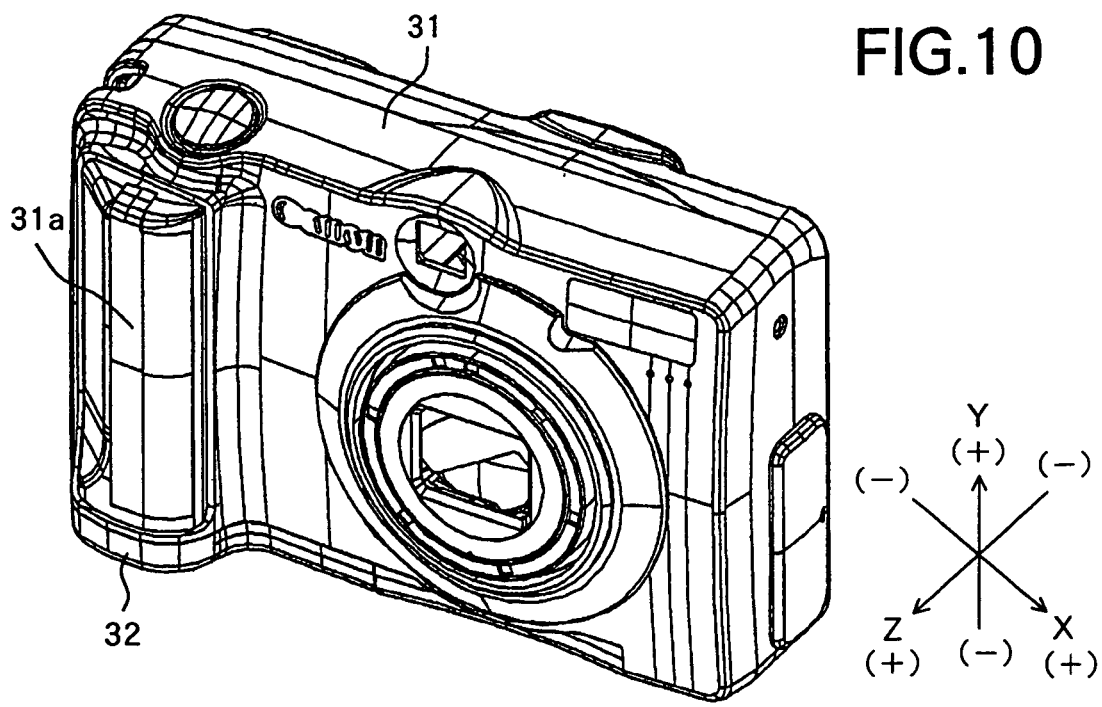
FIG. 10 is an external perspective view of a prior-art camera.
Figure 11:
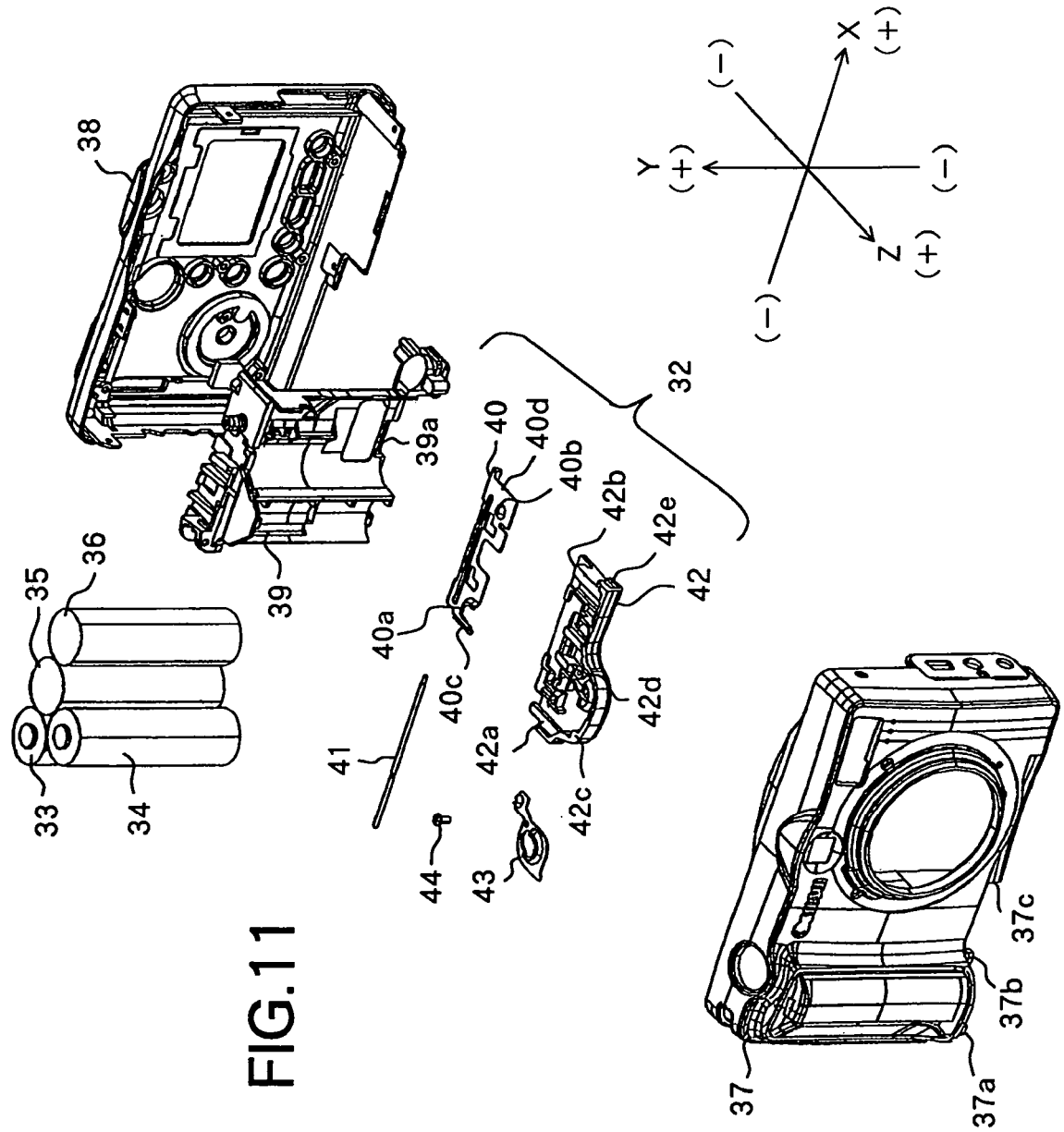
FIG. 11 is an exploded perspective view of a prior-art camera.

When the battery lid 2 is in the state (opened state) shown in FIGS. 6 and 9, the operator inserts the batteries 15 to 18 in the correct orientations into the battery chamber. Then by pressing the battery lid 2 with a finger and rotating it by 90 degrees or more to close the opening of the battery chamber, the state shown in FIGS. 5 and 8 is entered.

In this process, since the lid cover member 9 is set at a position to which it is energized by the first energizing spring 10, the engaging portions 9d to 9f will not collide with the claw portions 3a to 3c. Also, since an appropriate clearance L is provided between the contacting surfaces 3d and 3e and the contacting surfaces 6d and 6e, the contacting surfaces will not collide with each other. The battery lid 2 can thus be closed smoothly.

When the battery lid 2 is in the state of FIG. 5 (FIG. 8), the lid cover member 9 is put in a position that is shifted with respect to the main camera body 1 (opening of the battery chamber) by the receiving of the energizing force of the first energizing spring 10.

When the lid cover member 9 is slid in the Z (−) direction from the state shown in FIG. 5, the engaging portions 9d to 9f engage with the claw portions 3a to 3c (FIGS. 4 and 7). At this point, the release member 11 is slidingly moved in the X (+) direction of FIG. 4 by receiving the energizing force of the second energizing spring 12 and the end portion 11d engages with the engaging portion provided in the camera body 1.

Thereafter, even when the finger is removed from the battery lid 2, the battery lid 2 can be kept in the completely closed state as shown in FIG. 4. To open the battery lid 2 again, the above-described operations are performed again.

The case where the front cover 3 (action grip portion 1a) receives an external force shall now be described.

When the battery lid 2 is in the closed state (FIG. 7), the contacting surfaces (inner walls) 3d and 3e of the front cover 3 and the contacting surfaces (contacting portions) 6d and 6e of the base member 6 are in positions where they oppose each other across a clearance L.

Thus even when the front cover 3 (action grip portion 1a) receives an external force and deforms towards the inner side of the main camera body (battery chamber), that is, in the Z (−) direction in FIG. 7 the front cover 3 will be deflected only by an amount corresponding to the clearance L and beyond that, the contacting surfaces 3d and 3e and the contacting surfaces 6d and 6e are put in a contacting state.

Thus even if an external force is applied to the front cover 3 further in the state in which the contacting surfaces 3d and 3e and the contacting surfaces 6d and 6e are in contact, since the external force will be received by the bearing portion 5a of the battery holder 5 via the base member 6 and the rotation shaft 7, the front cover 3 will not deform greatly. Since the deformation of the front cover 3 is thus restrained, vibrations will not be applied to the batteries 15 to 18 due to large deflection of the front cover 3 upon receiving an external force, and adverse effects on the contact states of the battery electrodes and the battery terminals 13 and 14 can be prevented.

Since the structure of the battery lid 2 is of the type with which just the lid cover member 9 is slid in the Z direction, the Z direction position of the base member 6 is fixed via the rotation shaft 7 at the bearing portion 5a. Since the clearance L between the contacting surfaces 3d and 3e and the contacting surfaces 6d and 6e is thus kept fixed constantly as shown in FIG. 8 even when the battery lid 2 is opened or closed, by setting the clearance L at the minimum necessary value, unnecessary deflection of the front cover 3 can be restrained and the battery lid 2 can be made to be opened and closed readily. The number of the contacting surface correspond to the contacting surfaces 3d, 3e, 6d and 6e which are formed on the front cover 3 and the base member 6 respectively is set freely.

Furthermore, in the case where the front cover 3 additionally serves a grip function as in the present embodiment, the front cover 3 can be suppressed from deforming largely when a photographer holds the main camera body 1 firmly and thus deformation or breakage of the internal structure of the battery chamber due to the pressing of the interior of the battery chamber by the front cover 3 can be suppressed.

Though as can be understood from FIG. 1, an integral lens type camera was described as the embodiment, this invention may also be applied to cameras, with which a lens apparatus is mounted detachably.

This invention may also be applied, in a camera equipped with an image pickup element that converts an object image formed by an image taking optical system to electrical signals by photoelectric conversion, to a structure for housing a recording medium (accessory), in which image data obtained by the use of the image pickup element are recorded.

This invention may also be applied for example to portable phones, PDA (Personal Digital Assistants), and other electronic equipment, besides cameras, in which batteries or other accessories can be housed.

While preferred embodiments have been described, it is to be understood that modification and variation of the present invention may be made without departing from scope of the following claims.

What is claimed is:

1. An electronic equipment comprising:
   a main body having a housing chamber which houses accessories;
   a lid member rotating with respect to an opening of the housing chamber to open and close the opening; and
   a base member interlocked with the lid member with respect to the rotating operation of the lid member;
   wherein there is a gap between an inner wall of the housing chamber and the base member in the closed state of the lid member, the gap in which any member is not arranged, and
   wherein, when the main body receives external force, the inner wall deforms by the gap towards the inner side of the housing chamber and then contacts with the base member.

2. The electronic equipment according to claim 1, wherein the base member is rotatably supported at one end side by the main body and has, at the other end side, a contacting portion that contact the inner wall.

3. The electronic equipment according to claim 2, wherein the contacting portion contacts the inner wall that have been deformed in a direction orthogonal to rotation axis of the lid member in a plane orthogonal to the direction in which the accessories are housed.

4. The electronic equipment according to claim 2, wherein the base member is disposed within the plane containing its rotation axis and the contacting portion.

5. The electronic equipment according to claim 1, wherein
the accessories are batteries and
the base member has terminals that contact the batteries that are housed in the housing chamber.

6. The electronic equipment according to claim 1, wherein
the part of the main body that forms the housing chamber forms a grip part.

7. The electronic equipment according to claim 1, wherein
the lid member opens and closes the opening along with the base member, and
the lid member is mounted in a manner enabling sliding with respect to the base member and is engaged and disengaged with respect to the main body by sliding movements.

* * * * *

UNITED STATES PATENT AND TRADEMARK OFFICE
CERTIFICATE OF CORRECTION

PATENT NO. : 7,058,295 B2  Page 1 of 1
APPLICATION NO. : 10/770037
DATED : June 6, 2006
INVENTOR(S) : Kenya Nishiwaki It is certified that error appears in the above-identified patent and that said Letters Patent is hereby corrected as shown below:

Column 3, line 8, delete "opened-state" and insert --opened state--

Signed and Sealed this

Twenty-eighth Day of November, 2006

JON W. DUDAS
*Director of the United States Patent and Trademark Office*